US006220022B1

(12) United States Patent
Müller et al.

(10) Patent No.: US 6,220,022 B1
(45) Date of Patent: Apr. 24, 2001

(54) CATALYST SYSTEM FOR THE TREATMENT OF EXHAUST GASES FROM DIESEL ENGINES

(75) Inventors: Wilfried Müller, Karben; Jürgen Leyrer, Rheinfelden; Rainer Domesle, Alzenau; Klaus Ostgathe, Mainz; Egbert Lox, Hanau; Thomas Kreuzer, Karben, all of (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/180,112

(22) PCT Filed: Mar. 5, 1998

(86) PCT No.: PCT/EP98/01234

§ 371 Date: Aug. 4, 1999

§ 102(e) Date: Aug. 4, 1999

(87) PCT Pub. No.: WO98/39083

PCT Pub. Date: Sep. 11, 1998

(30) Foreign Application Priority Data

Mar. 6, 1997 (DE) .............................. 197 09 102

(51) Int. Cl.$^7$ ....................................... F01N 3/10
(52) U.S. Cl. ................. 60/299; 60/301; 60/302; 422/170; 422/177; 422/180; 423/213.5
(58) Field of Search ............... 60/299, 301, 302; 422/169, 170, 171, 177, 180; 423/213.5, 213.7

(56) References Cited

U.S. PATENT DOCUMENTS

| 5,157,007 | 10/1995 | Domesle et al. . | |
|---|---|---|---|
| 5,365,733 | * 11/1994 | Takeshima et al. | 60/278 |
| 5,443,803 | 8/1995 | Mizuno et al. . | |
| 5,514,354 | 5/1996 | Domesle et al. . | |
| 5,928,981 | 7/1999 | Leyrer et al. . | |
| 5,941,068 | * 8/1999 | Brown et al. | 60/279 |
| 5,950,423 | * 9/1999 | Hampton | 60/274 |
| 5,956,949 | * 9/1999 | Mayer et al. | 60/301 |
| 6,029,441 | * 2/2000 | Mizuno et al. | 60/274 |
| 6,044,644 | * 4/2000 | Hu et al. | 60/302 |
| 6,047,544 | * 4/2000 | Yamamoto et al. | 60/285 |

FOREIGN PATENT DOCUMENTS

| 39 40 758 C2 | 12/1989 | (DE) . |
|---|---|---|
| 4014215A1 | 11/1990 | (DE) . |
| 3912915C1 | 12/1990 | (DE) . |
| 196 14 540 | 4/1996 | (DE) . |
| 19617563 | 6/1997 | (DE) . |

OTHER PUBLICATIONS (1) DE 36 42 018, WPUDS, AN 1987–179057 (26).
(2) DE 40 32 085, WPIDS, AN 1992–133049 (17).
(3) DE 39 12 915, WPIDS, AN 1990–355925 (48).
(4) DE 40 14 215, WPIDS, AN 1990–343764 (46).
(5) DE 196 17 563, WPIDS, AN 1997–311996 (29).
Patent Abstract of Japan 6–336A, C1187, Apr. 7, 1994, vol. 18, No. 198.
Patent Abstract of Japan 4–35724A, C940, May 14, 1992, vol. 16, No. 202.

* cited by examiner

Primary Examiner—Thomas Denion
Assistant Examiner—Binh Tran
(74) Attorney, Agent, or Firm—Smith, Gambrell & Russell

(57) ABSTRACT

A catalyst system for the treatment of exhaust gases from a diesel engine includes a first and a second catalyst reducing catalyst arranged in series in an exhaust gas treatment system. The first catalyst is located near the engine in a region of the exhaust gas treatment system in which the exhaust gas temperature reaches temperatures of more than 200° C. under full engine load. The second catalyst is located further from the engine in a region of the exhaust gas treatment system in which the exhaust gas temperature reaches a maximum of 500° C. under full engine load. The maximum nitrogen oxides reduction in the first catalyst takes place at a lower temperature than the maximum nitrogen oxides reduction in the second catalyst.

16 Claims, 2 Drawing Sheets

CATALYST SYSTEM FOR THE TREATMENT OF EXHAUST GASES FROM DIESEL ENGINES

BACKGROUND OF THE INVENTION

1. Field of the Invention

The present invention relates to a catalyst system for the treatment of exhaust gases from diesel engines.

2. Description of the Related Art

The exhaust gas from diesel engines contains, during normal operating phases, a high proportion, about 3 to 10 vol. %, of oxygen in addition to unburnt hydrocarbons (HC), carbon monoxide (CO) and nitrogen oxides ($NO_x$). Since the concentration of oxygen in the exhaust gas is greater than that required stoichiometrically, it is not possible to convert all three hazardous substances by the three-way process conventionally used with petrol engines. Petrol engines usually operate with normalised air/fuel ratios $\lambda$ close to 1, while diesel engines operate with normalised air/fuel ratios greater than 1.2. The normalised air/fuel ratio $\lambda$ is the air:fuel ratio (kilograms of air to kilograms of fuel) standardized to stoichiometric operation.

The composition of the exhaust gas from diesel engines is very dependent on the particular operating phase of the engine. In the cold-start phase, that is the first 60 to 120 seconds after starting the engine, the exhaust gas has a high concentration of hydrocarbons, but the concentration of nitrogen oxides is still low. With longer operating times and under higher engine loads, the emissions of unburnt hydrocarbons decrease and emissions of nitrogen oxides increase.

The unburnt hydrocarbons and carbon monoxide in diesel gas exhausts can be converted relatively easily by oxidizing catalysts.

This type of catalyst is described, for example, in DE 39 40 758 C2. This comprises an oxidizing catalyst with high rates of conversion for hydrocarbons and carbon monoxide and an inhibited oxidizing effect towards nitrogen oxides and sulfur dioxide. Nitrogen oxides can pass over the catalyst virtually unchanged.

Nitrogen oxides can be converted only by using special reducing catalysts, due to the high oxygen content of diesel exhaust gas. Basically this means that these reducing catalysts also exhibit a high oxidizing effect towards carbon monoxide and hydrocarbons.

The rates of conversion of a reducing catalyst for the individual hazardous components depend strongly on the exhaust gas temperature. With increasing exhaust gas temperature, the oxidation of hydrocarbons and carbon monoxide is initiated first and oxidizing rates of more than 70% are achieved within a temperature interval of about 150 to 175° C. As the temperature increases further the conversion of hydrocarbons remains approximately constant. The exhaust gas temperature at which a rate of conversion of 50% for the particular hazardous substance is achieved is called the light-off temperature for this hazardous substance.

The rate of conversion for nitrogen oxides varies in the same way as the rate of conversion for hydrocarbons. However, it does not increase regularly, but passes through a maximum at temperatures at which the oxidation of the hydrocarbons has virtually reached its maximum value and then decreases with increasing temperatures to almost zero. Optimum rates of conversion for nitrogen oxides are therefore achieved only in a narrow temperature window. The hydrocarbons and carbon monoxide contained in the exhaust gas are required as reducing agents.

The conversion curves for the individual hazardous substance depend strongly on the formulation of the particular catalyst. This also applies to nitrogen oxides. The position and width of the temperature window and the maximum degree of conversion which can be achieved in this window depend on the catalyst formulation. So-called low temperature catalysts have been disclosed and reach their maximum nitrogen oxide conversion at temperatures between 200 and 250° C. In the case of high temperature catalysts, the maximum for nitrogen oxide conversion is situated above 300°C.

Reducing catalysts in the prior art have a maximum conversion for nitrogen oxides in oxygen-containing diesel exhaust gas of more than 55% at a temperature of about 200° C. The full width at half-maximum of the reaction curve for nitrogen oxides is about 100° C.

These types of catalysts are described, for example, in "Design Aspects of Lean $NO_x$ Catalysts for Gasoline and Diesel Engine Applications" by Leyrer et. al. in SAE No. 952495, 1995, and in "Catalytic reduction of $NO_x$ with hydrocarbons under lean diesel exhaust gas conditions" by Engler et. al. in SAE No. 930735, 1993. Catalysts based on zeolites which may be exchanged with a variety of catalytically active metals (for example copper or platinum) are used. Further reducing catalysts are described in patent application DE 196 14 540.6 which is not a prior publication.

The strong temperature dependence of the rates of conversion of nitrogen oxides represents a major problem during the purification of diesel exhaust gases because the engine outlet temperature of the exhaust gases from diesel vehicles during operation can vary between about 100 and 600° C. depending on the actual driving conditions. High rates of conversion are therefore only achieved during brief phases of operation during which the exhaust gas temperature is within the optimum range for the catalyst used.

DE 40 32 085 A1 discloses a catalyst arrangement for reducing nitrogen oxides in an exhaust gas which is produced within a wide range of exhaust gas temperatures. The arrangement consists of at least two catalyst beds which are arranged directly one after the other and consist of different catalyst materials which have their greatest catalytic effect in different, adjacent zones of the exhaust gas temperature range. The catalyst bed in which the optimum effect is achieved at a higher temperature is arranged upstream of the other catalyst bed.

Furthermore, DE 39 40 758 C2 discloses the treatment of exhaust gas from diesel engines by using oxidizing catalysts. For space reasons, the volume of catalyst which is required is frequently divided between one catalyst in the engine compartment and one catalyst in the under-floor region. The use of reducing catalysts has also been disclosed. To improve the nitrogen oxide conversion, additional diesel fuel, as a reducing agent, is frequently injected into the exhaust gas upstream of the catalyst.

DE 36 42 018 describes this type of arrangement. In order to remove the carbon monoxide and excess hydrocarbon which is not consumed during nitrogen oxide conversion by oxidation, the reducing catalyst may be connected to a second catalyst which may be designed as a simple oxidizing catalyst.

Hydrocarbons and carbon monoxide can be efficiently converted by known catalyst systems. The conversion of nitrogen oxides, however, is still unsatisfactory. It reaches satisfactory values only during specific operating phases of the engine.

SUMMARY OF THE INVENTION

The object of the present invention is to provide a catalyst system which has an optimum rate of conversion for all hazardous substances in diesel exhaust gas over a wide range of operating states for a diesel engine.

This object is achieved by a catalyst system for the treatment of exhaust gases from a diesel engine consisting of a first and a second catalyst which are arranged in series in the exhaust gas treatment unit. The catalyst system is characterised in that both catalysts are reducing catalysts and the first is located near the engine in a region of the exhaust gas treatment unit in which the exhaust gas temperature reaches more than 200 to 300° C. when the engine is under full load and the second catalyst is located further from the engine, wherein the exhaust gas temperature in this region of the exhaust gas treatment unit which is further from the engine is within the temperature window of the second catalyst, when the engine is under full load.

In this region of the exhaust gas treatment unit which is further from the engine, the exhaust gas temperature reaches a maximum of 500° C.

BRIEF DESCRIPTION OF THE DRAWINGS

The above and other objects, features and advantages of the present invention will be apparent to those skilled in the art with reference to the accompanying drawings, in which.

DETAILED DESCRIPTION OF THE INVENTION

Figure 1:
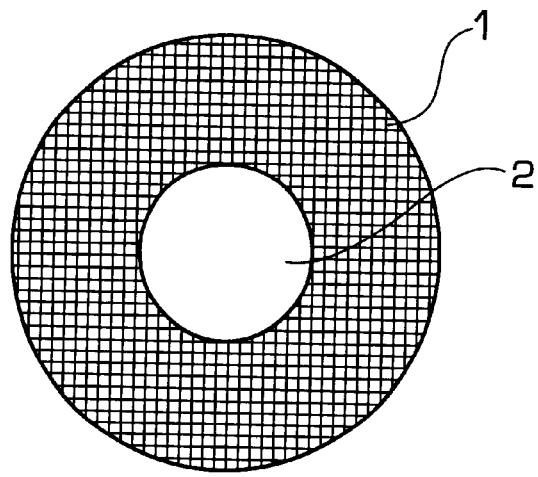
FIG. 1 is a cross-sectional view of an inlet face of a catalyst according to an embodiment of the invention.

In a preferred embodiment, the first catalyst has one or more zones with lower catalytic activity than the remainder of the catalyst, which permit slippage of non-converted hydrocarbons and carbon monoxide when the engine is running under full load.

The first catalyst is intended, according to the invention, to have the lowest possible light-off temperatures for the hazardous components. In combination with being incorporated close to the engine it is therefore able to convert the hazardous substances at a very early point during the cold-start phase. However, this means that the temperature window for the conversion of nitrogen oxides is passed through very rapidly. At the end of the cold-start phase hydrocarbons and carbon monoxide are virtually fully converted by the first catalyst. The rate of conversion for nitrogen oxides, however, drops to approximately zero due to the high exhaust gas temperatures of up to 600° C. achieved during operation under full load.

In order to obtain high conversion of nitrogen oxides in this operating state, a second reducing catalyst, according to the invention, is incorporated further from the engine in the exhaust gas unit. The position of this second catalyst is in a region of the exhaust gas unit in which the exhaust gas temperature does not exceed a maximum of 500° C. even when the engine is running under full load. The invention uses the known fact that the exhaust gas cools down while flowing through the exhaust gas pipe. Given an exhaust gas temperature of 600° C., a temperature loss of about 50 to 100° C. per meter of exhaust pipe can be expected. According to the invention the second reducing catalyst is located in a region of the exhaust gas unit in which the exhaust gas temperature is within the temperature window for nitrogen oxide conversion in the second catalyst when operating under full load and over long periods. To achieve this objective, it may be necessary to force cool the exhaust gas by means of cooling fins welded onto the exhaust pipe. If, for structural reasons, a very long exhaust pipe is required between the two catalysts then, conversely, it may also be required to provide the exhaust pipe with thermal insulation in order to prevent the exhaust gas cooling down too much.

The actual exhaust gas temperature which needs to be established at the second catalyst naturally depends on the catalyst formulation selected for the second catalyst and on the position of its temperature window for nitrogen oxide conversion. Accordingly, the previously-mentioned temperature of at most 500° C. is understood to be only a guideline.

When the diesel engine operates continuously or under full load, carbon monoxide and hydrocarbons are converted almost completely by the first catalyst, whereas the nitrogen oxides in this operating state pass over the catalyst unchanged. However, the nitrogen oxides cannot easily be converted even on the second reducing catalyst because the carbon monoxide and hydrocarbons have already been converted on the first catalyst and there is now a lack of reducing agent in the exhaust gas. Therefore, in a preferred embodiment of the invention, the first reducing catalyst is designed with zones of reduced catalytic activity as compared with the other zones so that even at high exhaust gas temperatures there is a certain degree of slippage of non-converted hydrocarbons and carbon monoxide which then act as reducing agents for the second reducing catalyst.

In the simplest case, these zones with reduced catalytic activity can consist of an empty passageway in the first catalyst. Alternatively, it is possible to produce this zone with reduced catalytic activity as an annular zone at the periphery of the first catalyst. It is also possible to produce segments or sectors as zones with reduced catalytic activity. The volume of these zones in comparison with the total volume of the first reducing catalyst must be selected in such a way that the slippage of non-converted hydrocarbons and carbon monoxide provides an amount of reducing agent which is sufficient to convert the nitrogen oxides in the second reducing catalyst.

In a preferred embodiment of the invention, the zones with reduced catalytic activity in the first reducing catalyst are provided with an adsorber for hydrocarbons. At the beginning of the cold-start phase hydrocarbons are adsorbed here and only desorbed after a time delay as a result of the increasing exhaust gas temperature. At this point the second reducing catalyst connected in series is able to at least partly convert the desorbed hydrocarbons.

A further improvement may be produced if the zones with lower catalytic activity are provided with a smaller proportion of catalytically active components. This proportion may be adjusted in such a way that the concentration of catalytically active components in these zones is 0 to 20% of the concentration in the other zones of the catalyst.

Any catalyst formulations mentioned in the prior art may be used as catalyst formulations. The first catalyst should have the lowest possible light-off temperatures and thus also have a temperature window for nitrogen oxide conversion which lies at the lowest possible temperature. Light-off temperatures and temperature windows in the second catalyst and the exhaust gas temperature within the second catalyst during continuous and full load operation must be mutually adjusted in such a way that an optimum conversion of nitrogen oxides is produced during these operating phases. There is a variety of catalyst formulations which offers a person skilled in the art this possibility and the temperature of the exhaust gas, when it reaches the second reducing catalyst, can be adjusted to lie within the optimum temperature window for the particular catalyst formulation used, by means of structural features.

In order to observe these provisos, the second reducing catalyst is generally chosen to have a maximum for nitrogen oxide reduction at a temperature which is higher than the temperature for maximum nitrogen oxide reduction of the first catalyst.

The zones with reduced catalytic activity in the first reducing catalyst, when using catalyst supports with a honeycomb structure for example, may be obtained by blocking the flow channels in the intended zones before coating the catalyst support with the catalytically active coating. A material is selected as blockage material which can be burnt away without leaving a residue during calcination of the coating. Furthermore, it is possible to mask the zones intended to have reduced catalytic activity before the coating procedure. If the slippage of non-converted hydrocarbons and carbon monoxide which is required is intended to take place through a hole in the catalyst structure, this can be taken into account during preparation of the substrate or the hole may be drilled out of the catalyst support prior to the coating procedure.

Figure 2:
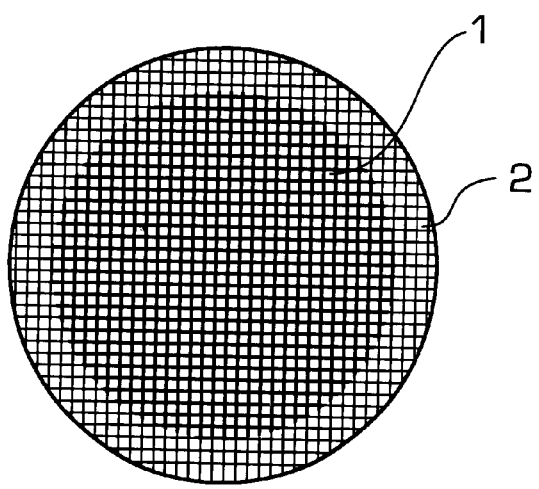
FIG. 2 is a cross-sectional view of an inlet face of a catalyst according to another embodiment of the invention.
Figure 3:
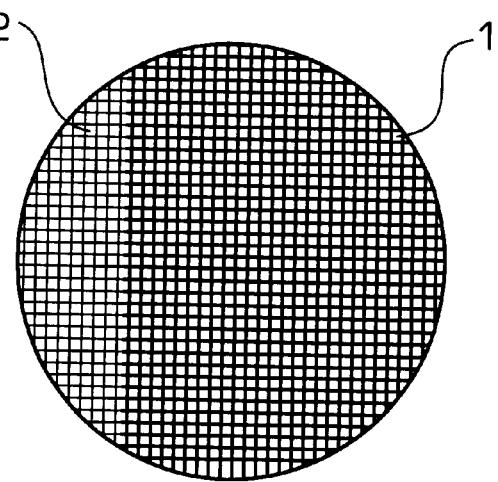
FIG. 3 is a cross-sectional view of an inlet face of a catalyst according to a further embodiment of the invention.

A variety of embodiments for the zones with reduced catalytic activity in the first reducing catalyst are shown in FIGS. 1 to 3. The figures each show a view of the inlet face of a catalyst with a honeycomb structure, through which runs a set of parallel exhaust gas channels. The catalytically active zones of the catalyst, that is the internal walls of the exhaust gas channels in these zones, are provided with a catalytically active coating, labelled with the number 1. The number 2 denotes the zones in the catalyst with reduced catalytic activity. In FIG. 1 this zone consists of a central passageway. In FIG. 2 the zone with reduced catalytic activity is designed as an annular zone at the periphery of the catalyst structure. In this zone, the internal walls of the exhaust gas channels may be specified to be coating-free or may be provided with an adsorber coating for hydrocarbons. However, this zone may also have catalytically active components at a concentration of 0 to 20% of the concentration of catalytically active components in zone 1. The catalytically active components in zone 2 may not necessarily be identical to the catalytically active components in zone 1.

FIG. 3 shows the zone with reduced catalytic activity in the form of a segment. The precise shape of the zones with reduced catalytic activity is of no particular importance. The essential feature is only that the cross-section of these zones should be such that during continuous and full load operation, sufficient slippage of non-converted hydrocarbons and carbon monoxide takes place for reduction of nitrogen oxides to take place in the second reducing catalyst.

EXAMPLE

The structure of the catalyst system for a 2.2 liter direct injection diesel engine is described in this example.

1st Reducing Catalyst

A honeycomb structure made from cordierite with 62 cells, or flow channels, per cm², a cell wall thickness of 0.2 mm, a diameter of 125 mm and a length of 180 mm, corresponding to a volume of 2.2 l, was provided with a catalytic coating in accordance with examples 1, 9 and 17 from patent application DE 196 14 540, apart from a 5 mm wide outer annular zone.

The reducing catalyst in this patent application is one in which a coating is applied to a catalyst support. The catalyst material in accordance with DE 196 14 540 contains a mixture of a total of 5 different zeolites with different moduli X (molar ratio $SiO_2:Al_2O_3$). Furthermore, the mixture contains an aluminium silicate activated with platinum which has a concentration of silicon dioxide of 5 wt. % with respect to the total weight of aluminium silicate. The specific surface area of this material in the fresh state is about 286 $m^2/g$. The elements silicon and aluminium are distributed very homogeneously through the material. Its crystal structure, in contrast to that of zeolites, is boehmitic. The preparation of an aluminium silicate of this type is described in patent DE 38 39 580 C1.

The following procedure was used to prepare the first reducing catalyst, in accordance with DE 196 14 540:

First, the aluminium silicate was activated with platinum. To achieve this, it was placed in contact with an aqueous solution of tetraamineplatinum(II) hydroxide with constant stirring, so that a moist powder was produced. After drying for 2 h at 120° C. in air, the powder obtained was calcined for 2 h at 300° C. in air. Then reduction was performed in a flow of forming gas (95 vol. % $N_2$ and 5 vol. % $H_2$) at 500° C. for a period of 2 h. The Pt-aluminium silicate powder obtained in this way contained 0.15 wt. % of platinum with respect to the total weight.

An aqueous coating dispersion containing 40% solids was made up from the previously-prepared Pt-aluminium silicate powder. To this were added the following zeolite powders in the ratio of 1:1:1:1:1: DAY (X=200); Na-ZSM5 (X>1000); H-ZSM5 (X=120); H-ZSM5 (X=40); H-mordenite (X=20).

The precise composition of the coating dispersion is given in table 1.

TABLE 1

| Composition of the coating dispersion | | |
|---|---|---|
| Raw material | | Composition (wt. %) |
| Pt-aluminium silicate | | 67 |
| H-mordenite | (X = 20) | 6.6 |
| H-ZSM5 | (X = 40) | 6.6 |
| H-ZMS5 | (X = 120) | 6.6 |
| DAY | (X > 200) | 6.6 |
| Na-ZSM5 | (X > 1000) | 6.6 |

The initially-described honeycomb structure was coated by immersion in the coating dispersion with an amount of 180 oxides (sic) per liter of honeycomb volume. The coating was dried in air at 120° C. and then calcined for 2 h at 500° C. The coated honeycomb structure contained 0.18 g of platinum per liter of honeycomb structure volume.

Then 30% of the length of this honeycomb structure was coated with another catalyst material. Differently from the first catalyst material, the aluminium silicate in the second case was activated with 2.06 wt. % of platinum. Following the second coating procedure the honeycomb structure was dried and calcined in the same way as after the first coating procedure. The final catalyst contained 180 g of oxides per liter of catalyst volume with a platinum concentration of 0.18 g/l, as a result of the first coating. The weight of oxides in the second coating was 39 g with an absolute amount of platinum of 0.8 g.

The catalyst prepared in this way contained different amounts of coating along the direction of flow of the exhaust gas. This produced temperature windows for the reduction of nitrogen oxides which were shifted with respect to each other along the catalyst. For the purpose of the invention, however, only the measurement of the hazardous substance conversion in the integrated temperature windows available in the complete catalyst for the reduction of nitrogen oxides is critical. The variation in temperature windows along the catalyst is of less significance to the invention. Therefore, within the context of the invention, the expression 'temperature window' is always understood to mean only the temperature window for the entire catalyst.

The temperature window for the conversion of nitrogen oxides for this catalyst was between 180 and 250° C. with a maximum value for nitrogen oxide conversion under optimum conditions of 55% at 200° C.

2nd Reducing Catalyst

For the second reducing catalyst, a cordierite honeycomb structure of the same structural type as the first catalyst was used, but with a volume of only 1.8 l. This honeycomb structure was coated in the same way as the first honeycomb structure, with the difference that the second coating was applied to two regions, each amounting to 15% of the total length of the honeycomb structure and starting from each of the two end faces of the honeycomb structure. Also, the entire honeycomb structure received a coating. The temperature window of this catalyst was between 220 and 300° C. with a maximum value for nitrogen oxide conversion under optimum conditions of 60% at 280° C.

Application Example

Figure 4:
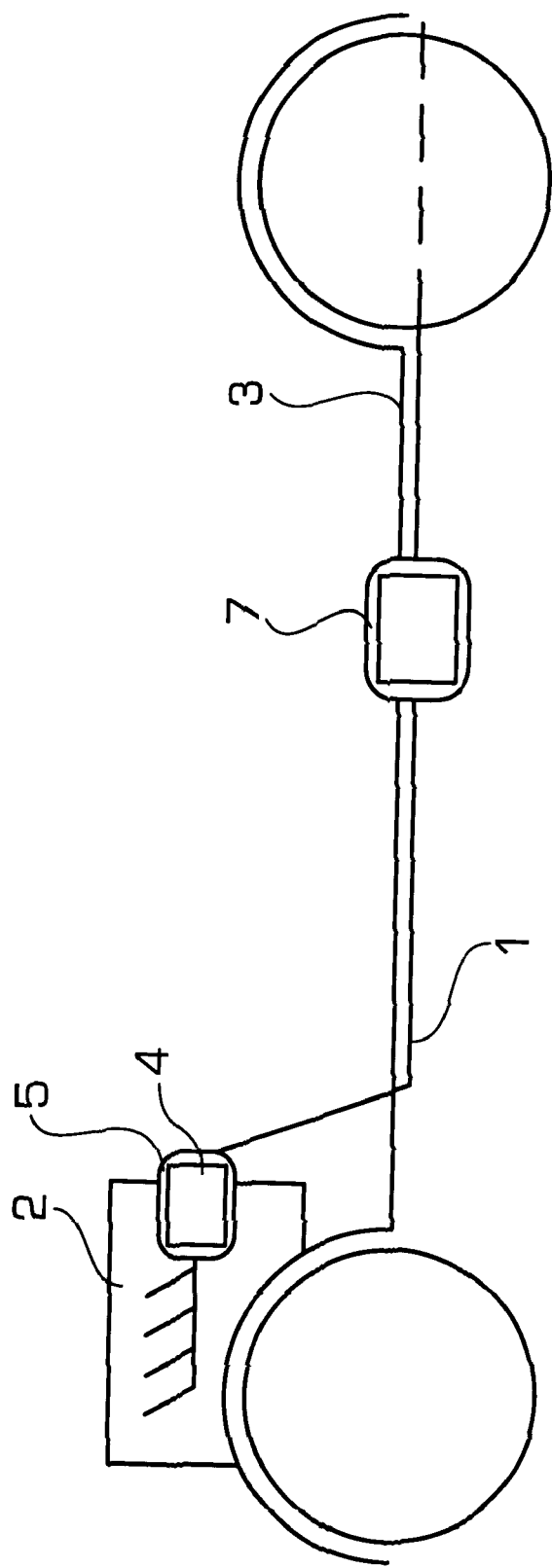
FIG. 4 depicts an exhaust gas treatment unit according to the invention associated with a vehicle.

The two catalysts were incorporated into an exhaust gas treatment unit of a 2.2 l diesel vehicle in accordance with the diagram shown in FIG. 4. The first reducing catalyst (4) was located just downstream of the engine outlet in a housing (5), the second reducing catalyst (6) was located in a housing (7) in the underfloor region (3) of the vehicle.

The nitrogen oxide conversions were measured with this exhaust gas unit during the so-called new European driving cycle (MVEG-A driving cycle; EWG directive 70/220 EWG). This driving cycle comprises 4 urban driving cycles at an average speed of 34 km/h and an open road cycle at a maximum speed of 120 km/h. The total duration of the MVEG-A cycle is 1180 seconds.

Downstream of the catalyst located near to the engine, increasing exhaust gas temperatures between 80 and 180° C. were measured during the 4 urban driving cycles. This temperature increased to values between 270 and 300° C. during the open road cycle.

The average conversion for nitrogen oxides over the entire MVEG-A cycle was 35%.

In another set of measurements, the reducing catalyst near to the engine was replaced by a catalyst of the same size but which had the coating described for the first catalyst over its entire cross-section. This catalyst thus had no annular zone with no coating. The average conversion for nitrogen oxides measured with this system was 28%. It was less than the value for the first set of measurements because, in particular during the open road cycle with its high exhaust gas temperatures, the hydrocarbons could no longer pass through the first catalyst in the amounts required for optimum reduction of the nitrogen oxides on the second catalyst. Nevertheless, a satisfactory conversion of nitrogen oxides was produced over the MVEG-A cycle, even with this system.

The results of the two trials are summarised in the following table:

| Catalyst system | Nitrogen oxide conversion |
| --- | --- |
| 1st reducing catalyst with coating-free annular zone | 35% |
| 1st reducing catalyst without a coating-free annular zone | 28% |

What is claimed is:

1. A system for treating an exhaust gas stream from a diesel engine, the system comprising:

a diesel engine which produces an exhaust gas stream;

a first reducing catalyst, positioned along the exhaust gas stream at a first catalyst position, at which the exhaust gas temperature under full engine load is greater than 200° C., the first reducing catalyst being provided with at least one zone having lower catalytic activity than the remainder of the catalyst, which zone permits slippage of non-converted hydrocarbons and carbon monoxide under full engine load; and a second reducing catalyst, positioned in series with the first reducing catalyst along the exhaust gas stream at a second catalyst position downstream or the first catalyst position, at which the exhaust gas temperature is within a temperature window for nitrogen oxides conversion of the second reducing catalyst under full engine load.

2. The system according to claim 1, wherein the at least one zone having lower catalytic activity comprises a passageway centrally located in the first reducing catalyst for the reduction of nitrogen oxides.

3. The system according to claim 1, wherein the at least one zone having lower catalytic activity consists of an annular zone at the periphery of the first reducing catalyst for the reduction of nitrogen oxides.

4. The system according to claim 3, wherein the at least one zone having lower catalytic activity is provided with an adsorber for hydrocarbons.

5. The system according to claim 1, wherein the at least one zone having lower catalytic activity consists of a segment of the first reducing catalyst for the reduction of nitrogen oxides.

6. The system according to claim 5, wherein the at least one zone having lower catalytic activity is provided with an adsorber for hydrocarbons.

7. The system according to claim 1, wherein the at least one zone having lower catalytic activity is provided with an adsorber for hydrocarbons.

8. The system according to claim 1, wherein the at least one zone having lower catalytic activity contains from 0 to 20% of an amount of catalytically active components which are present in a remainder of the first reducing catalyst for the reduction of nitrogen oxides.

9. The system according to claim 1, wherein a maximum amount of nitrogen oxide reduction in the first reducing catalyst occurs at a temperature which is lower than a temperature at which a maximum amount of nitrogen oxide reduction in the second reducing catalyst occurs.

10. The system according to claim 1, wherein the second catalyst position is a position at which an exhaust gas temperature under full engine load is no more than 500° C.

11. The system according to claim 9, wherein the first reducing catalyst has a light-off temperature for conversion of hazardous components which is lower than a light-off temperature for conversion of hazardous components of the second reducing catalyst.

12. The system according to claim 1, wherein an amount of slippage of non-converted hydrocarbons and carbon monoxide in the first reducing catalyst under full engine load is sufficient to convert nitrogen oxides in the second reducing catalyst.

13. The system according to claim 2, wherein:

a temperature window for conversion of nitrogen oxides in the first reducing catalyst is between 180° and 250° C., and a maximum value for the conversion of nitrogen oxides in the first reducing catalyst is 55% and occurs at a temperature of 280° C.; and a temperature window for conversion of nitrogen oxides in the second reducing catalyst is between 220° and 300° C., and a maximum value for the conversion of nitrogen oxides in the second reducing catalyst is 60% and occurs at a temperature of 280° C.

14. The system according to claim 1, wherein the temperature window for nitrogen oxides conversion of the second reducing catalyst under full engine load is defined as a range of temperatures at which at least half of a maximum amount of reduction conversion occurs.

15. The system according to claim 1, wherein:

the first reducing catalyst reaches a maximum nitrogen oxides conversion at a temperature between 200 and 250° C.; and the second reducing catalyst reaches a maximum nitrogen oxides conversions at a temperature greater than 300° C.

16. The system according to claim 1, wherein the first reducing catalyst has a light-off temperature for conversion of nitrogen oxides which is lower than a light-off temperature for conversion of nitrogen oxides of the second reducing catalyst.

* * * * *